United States Patent [19]

Catanese et al.

[11] Patent Number: 5,140,118
[45] Date of Patent: Aug. 18, 1992

[54] METAL TUBE INDUCTION ANNEALING METHOD AND APPARATUS

[75] Inventors: John A. Catanese, Seward; William A. Jacobsen, Burrell; John E. Carloni, Indiana, all of Pa.

[73] Assignee: Westinghouse Electric Corp., Pittsburgh, Pa.

[21] Appl. No.: 656,338

[22] Filed: Feb. 19, 1991

[51] Int. Cl.⁵ .............................................. H05B 6/10
[52] U.S. Cl. ................................ 219/8.5; 219/10.491; 219/10.57; 219/10.69; 219/10.77; 148/520; 148/570; 266/129; 266/252
[58] Field of Search ...................... 219/10.57, 8.5, 7.5, 219/10.491, 10.69, 10.71, 10.75, 10.77; 148/150, 154, 20.3, 27; 266/129, 252, 254

[56] References Cited

U.S. PATENT DOCUMENTS

| | | | |
|---|---|---|---|
| 4,165,246 | 8/1979 | Reinke et al. | 148/150 |
| 4,428,563 | 1/1984 | Cunningham et al. | 266/129 |
| 4,581,512 | 4/1986 | McGinn et al. | 219/10.491 |
| 4,721,836 | 1/1988 | Zeisse et al. | 219/10.69 |

Primary Examiner—Philip H. Leung

[57] ABSTRACT

A metal tube induction annealing apparatus employs an induction heating enclosure having an elongated glass tube encircled by an electromagnetic coil of an induction heating system which provides an induction annealing chamber for receiving a hollow metal tube for undergoing annealing and an inert purge gas for bathing the tube during annealing. Cooling stages are located end-to-end downstream of the induction enclosure for progressively cooling the annealed tube. The inert purge gas is made to flow upstream in a direction opposite to the downstream direction of tube movement through the annealing chamber and cooling stages for accomplishing constant bathing or shielding of the exterior and interior wall surfaces of the tube and removal of heat by inert purge gas flowing through and out of the trailing end of the tube.

10 Claims, 6 Drawing Sheets

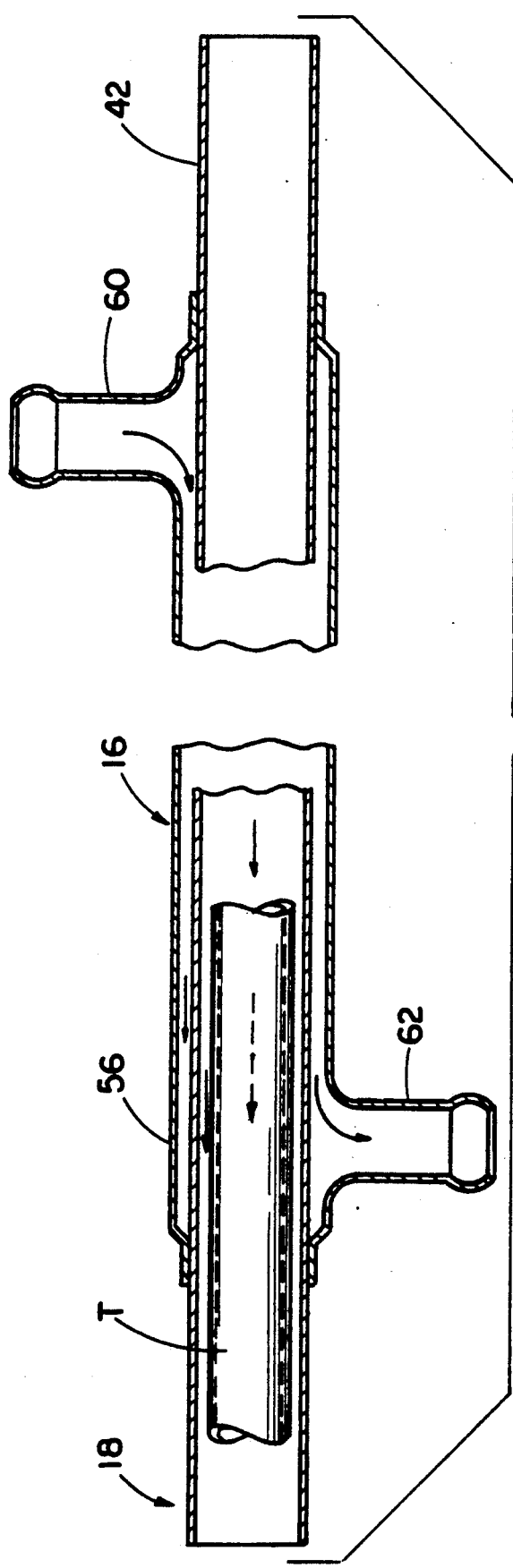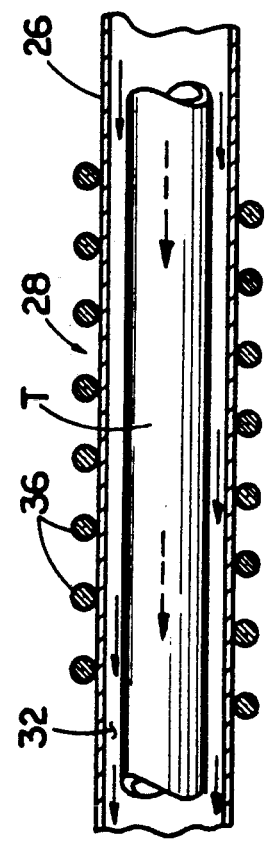
FIG. 9
FIG. 10

METAL TUBE INDUCTION ANNEALING METHOD AND APPARATUS

BACKGROUND OF THE INVENTION

1. Field of the Invention

The present invention relates generally to the manufacture of metal tubes for use in nuclear fuel rods and, more particularly, is concerned with an induction annealing method and apparatus particularly useful in conjunction with cold-pilgering manufacture of thin-walled metal tubes.

2. Description of the Prior Art

Metal tubes used in the manufacture of nuclear fuel rods are fabricated by multiple passes in a conventional cold-pilgering reduction process. In each pass of the cold-pilgering reduction process, a tube is advanced over a stationary mandrel and simultaneously compressed using two opposing roller dies resulting in the reduction of the cross-sectional area and in elongation of the tube. After fabrication by multiple pilgering passes, the tubes are subjected to a variety of processing steps including annealing, etching, rinsing, drying, carbide grit blasting, polishing, cleaning and inspecting of the tubes.

As practiced heretofore, metal tube annealing has been carried out generally on a batch basis, meaning that tubes are collected and annealed in lot size bundles, usually six hundred to one thousand to a bundle. Typically, it takes twelve to fourteen hours to batch anneal one thousand tubes. A major drawback of this process is that individual tubes in the batch do not receive the same time and temperature of heating.

U. S. Pat. No. 4,717,428 to Comstock et al, which is assigned to the same assignee as the present invention, proposes an induction annealing apparatus designed to anneal one tube at a time. The annealing apparatus employs an induction coil mounted inside of an aluminum box which serves as an inert atmosphere chamber. The metal tube is driven through the chamber and the induction coil as inert purge gas is introduced into and discharged from the chamber adjacent the entrance and exit ends of the box. After the annealed portion of the metal tube leaves the induction coil, it travels through an argon purge tube and water-cooled cooling tube also disposed in the chamber defined by the box. Adjustable jaw chucks are located on the entrance and exit ends of the box for supporting the tube as it travels through the chamber. While this apparatus is a step in the right direction, the process is very slow and time consuming and, in addition thereto, uses a considerable amount of argon gas.

Performing the annealing process in an economically viable fashion and in a way to obtain an acceptable quality annealed product, has been unattainable up to this point. If atmosphere is present as the tube is being annealed, the oxygen and nitrogen will react with the tube metal, such as zirconium, causing a layer of discoloration to form on the inside and outside surfaces of the tube. This oxidation residue on the tube is difficult to remove and its presence makes the tube more susceptible to corrosion. If this residue forms, the tube must usually be scrapped.

Consequently, a need exists for improvement in performance of the annealing process so as to obtain metal tubes of more acceptable quality.

SUMMARY OF THE INVENTION

The present invention provides an induction annealing method and apparatus designed to satisfy the aforementioned needs. The induction annealing method and apparatus is advantageously used in conjunction with cold-pilgering manufacture of thin-walled metal tubes. The unique features of the present invention are the use of a small diameter glass chamber for containing inert purge gas and the tube being annealed in conjunction with flow of the inert purge gas in a direction opposite to the direction of tube movement through the chamber for accomplishing constant shielding or bathing of the outside and inside diameter walls of the tube and heat removal by the gas flow from the end of the tube. By the process of induction annealing, every tube is subjected to the same time and temperature of heating and, thus, every tube will have the same characteristics Accordingly, the present invention is directed to an induction annealing apparatus which comprises: (a) an induction heating enclosure including an elongated glass tube having a pair of opposite open ends and a hollow interior and means for supporting the glass tube at its opposite ends, the glass tube defining an annealing chamber for receiving a hollow metal tube for undergoing annealing and an inert purge gas for bathing the tube during annealing, the glass tube having an inside diameter slightly greater than the outside diameter of the metal tube for defining an annulus therebetween for accommodating inert purge gas flow along an exterior surface of the metal tube; (b) an induction heating system including an electromagnetic coil encircling the glass tube of the chamber and means connected to the coil and being operable to energize the coil to generate a magnetic field through the glass tube for producing induction heating and annealing of the metal tube as it passes through the annealing chamber; (c) means disposed downstream of the induction heating enclosure in flow communication with the glass tube thereof for receiving an inert purge gas and directing flow thereof in an upstream direction opposite to a downstream direction of movement of the metal tube through the glass tube and the annealing chamber defined by the glass tube for accomplishing constant bathing of exterior and interior surfaces of the tube and removal of heat by the inert gas flow through the hollow metal tube and from a trailing end thereof; and (d) means for engaging and driving the metal tube to produce movement of the tube through the glass tube and the annealing chamber. Further, the glass tube has an inside diameter slightly greater than the outside diameter of the metal tube driven through the glass tube which defines an annulus between the interior of the glass tube and exterior of the metal tube for accommodating gas flow along the exterior of the metal tube. The inert gas receiving means includes a plurality of cooling stages disposed end-to-end in succession downstream of the induction heating enclosure.

The present invention also is directed to an induction annealing method which comprises the steps of: (a) providing an elongated glass tube having a pair of opposite open ends and a hollow interior defining an annealing chamber for receiving a hollow metal tube for undergoing annealing and an inert purge gas for bathing the tube during annealing, with the glass tube having an inside diameter slightly greater than the outside diameter of the metal tube for defining an annulus therebetween for accommodating gas flow along the exterior of the metal tube; (b) providing an electromagnetic coil encircling the glass tube and being energizable to generate a magnetic field that penetrates unopposed through the glass tube for producing induction heating and annealing of the metal tube as it passes through the chamber; (c) directing flow of an inert purge gas from downstream of the annealing chamber in a upstream direction opposite to a downstream direction of movement of the metal tube through the annealing chamber for accomplishing constant bathing of exterior and interior wall surfaces of the tube and removal of heat from the tube by gas flow through the interior of the tube and from a trailing end thereof; and (d) engaging and driving the metal tube to produce movement of the tube through the annealing chamber. Further, the induction annealing method includes moving the metal tube exiting from the induction heating enclosure through a plurality of cooling stages disposed end-to-end downstream of the annealing chamber for progressively cooling the annealed metal tube. The glass tube is supported in the enclosure at its opposite ends by centering assemblies.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 9 is an enlarged fragmentary longitudinal sectional view of one of the cooling stages of the apparatus of FIG. 1.

FIG. 10 is an enlarged fragmentary longitudinal sectional view of the induction annealing chamber of the apparatus of FIG. 1.

DETAILED DESCRIPTION OF THE INVENTION

Figure 1:
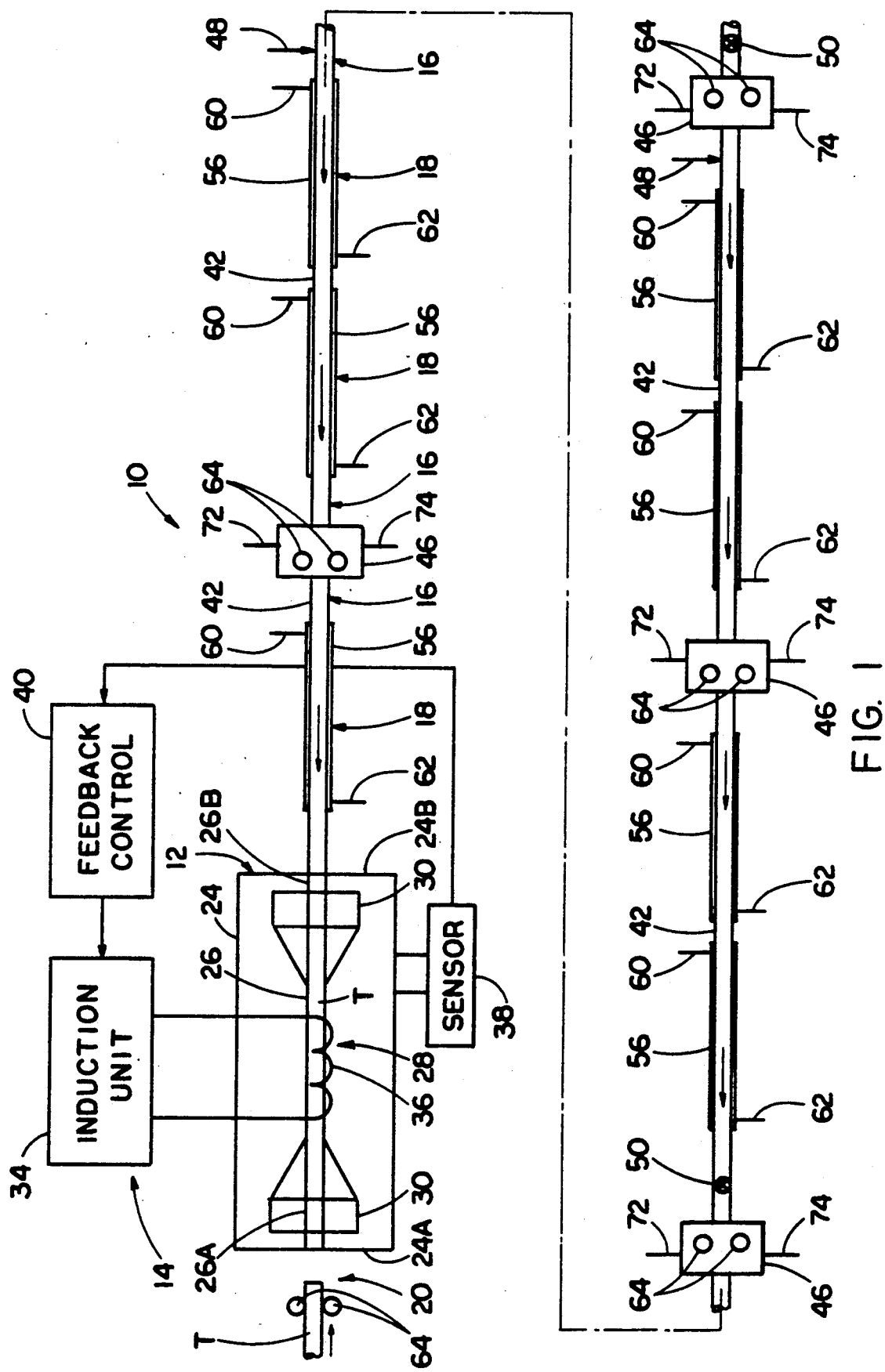
FIG. 1 is a top schematic diagram of an induction annealing apparatus of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
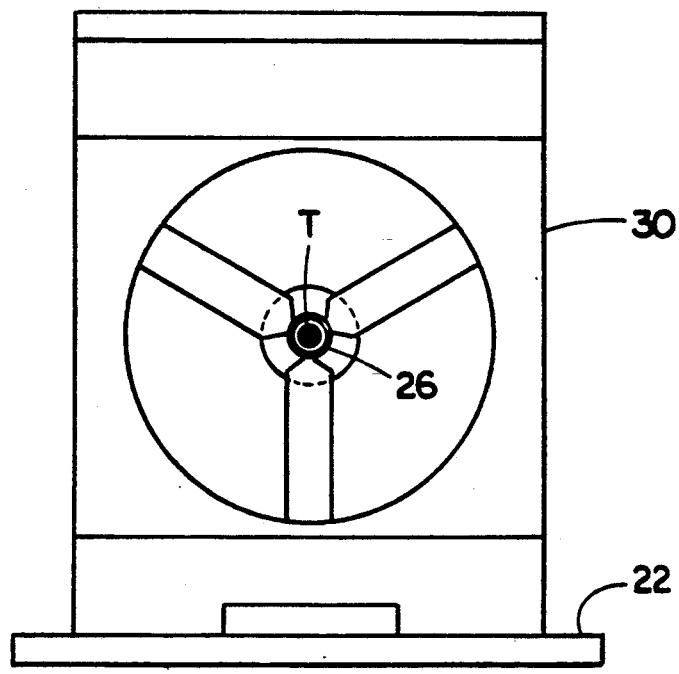
FIG. 2 is an end view of an induction annealing chamber centering assembly of the apparatus of FIG. 1.
Figure 3:
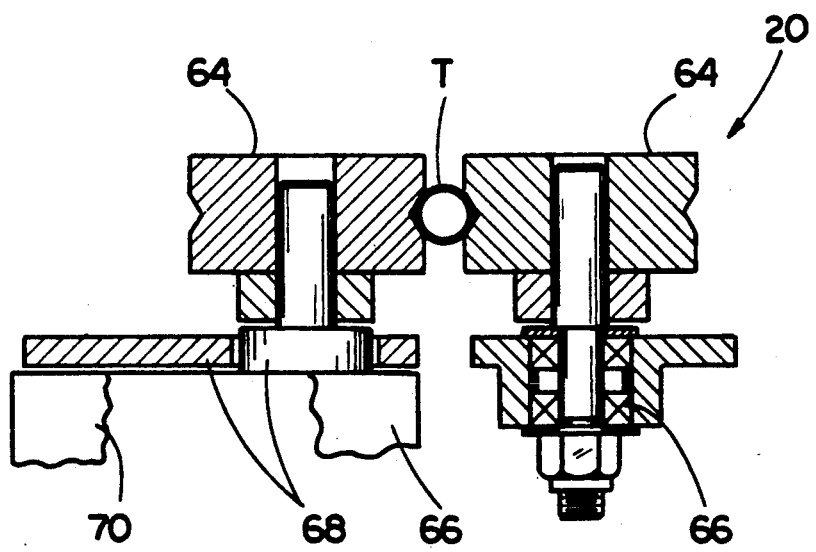
FIG. 3 is a vertical sectional view of a tube drive assembly of the apparatus of FIG. 1.
Figure 4:
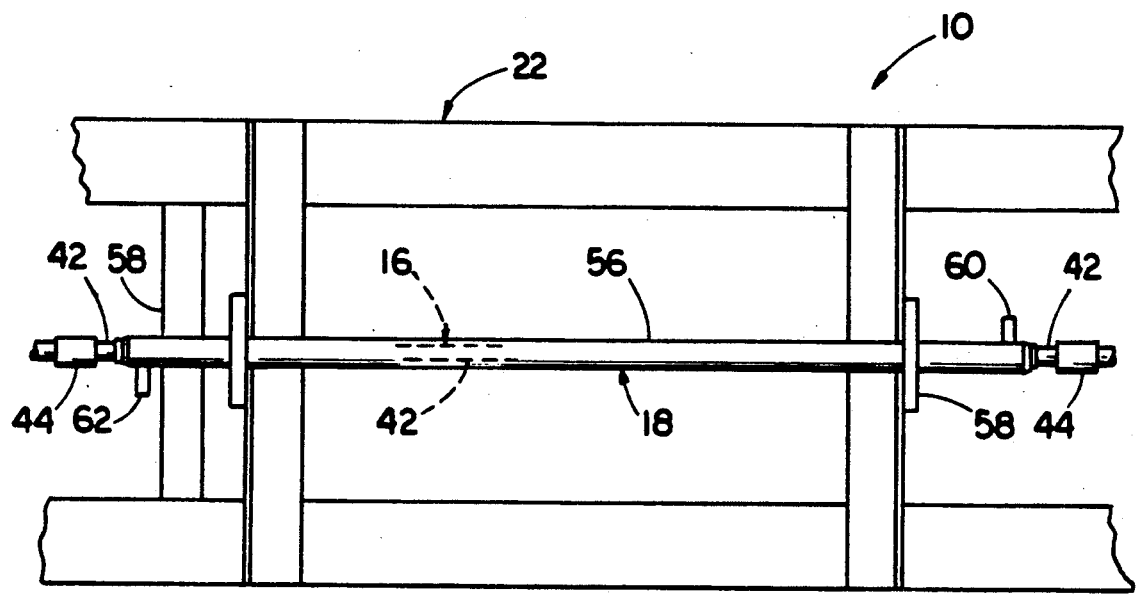
FIG. 4 is a fragmentary top plan view of one of the cooling stages of the apparatus of FIG. 1.
Figure 5:
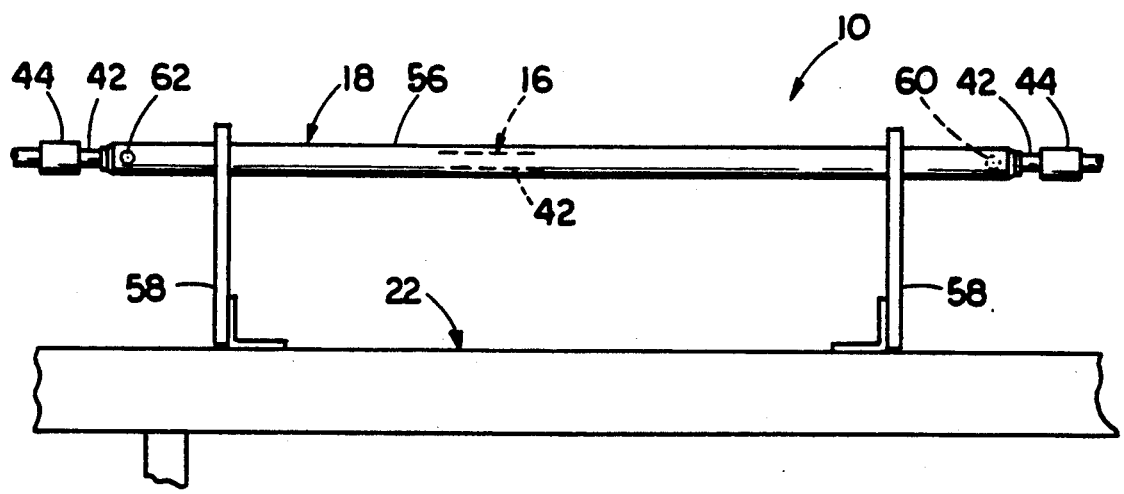
FIG. 5 is a side elevational view of the cooling stage of FIG. 4.
Figure 6:
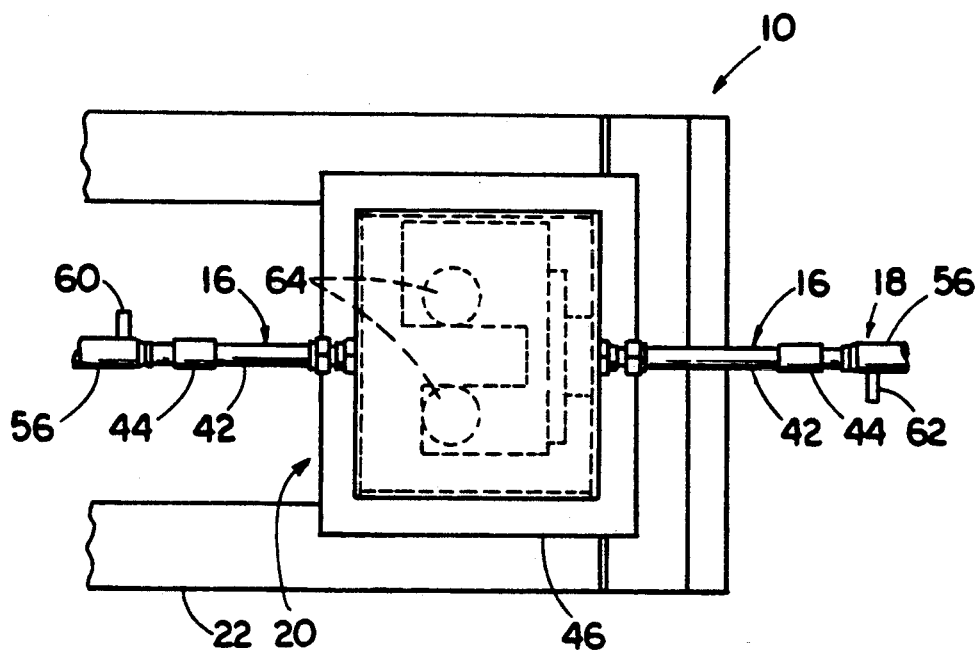
FIG. 6 is a fragmentary top plan view of a tube drive assembly located between successive cooling stages of the apparatus of FIG. 1.
Figure 7:
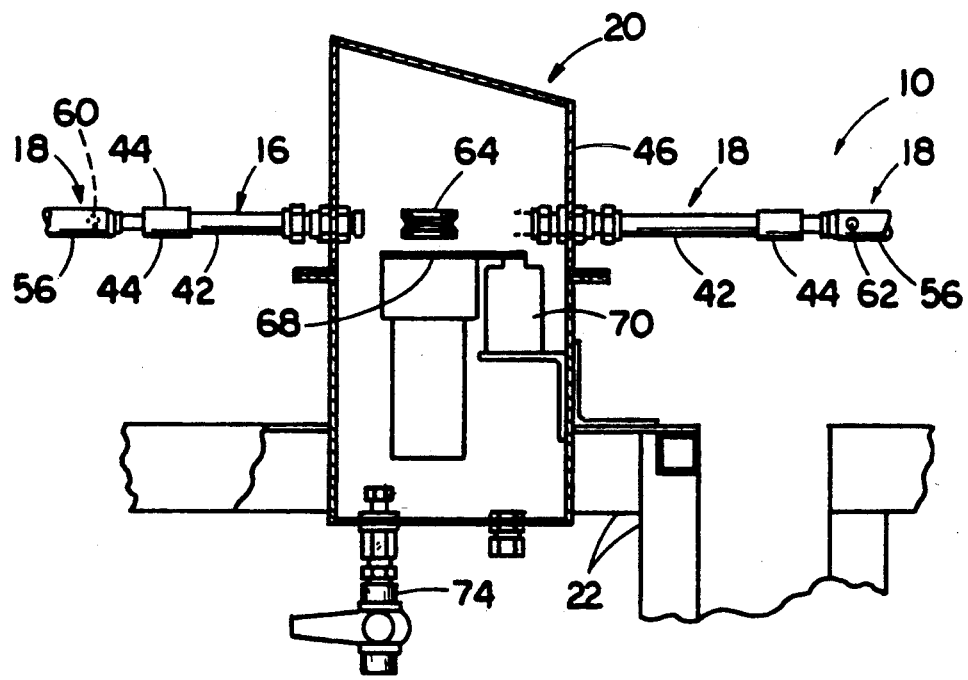
FIG. 7 is a side elevational view, with portions broken away, of the tube drive mechanism of FIG. 6.
Figure 8:
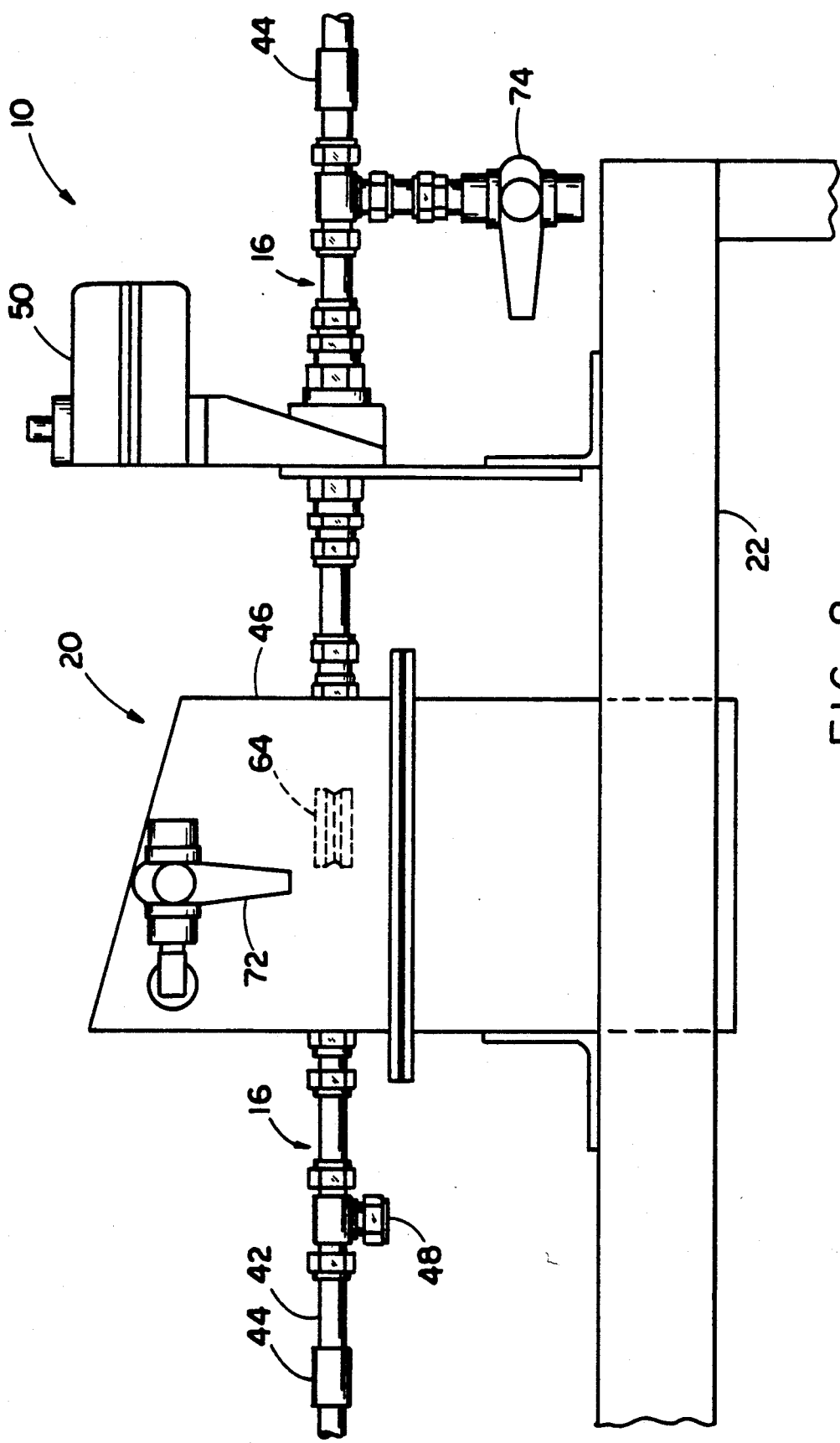
FIG. 8 is a side elevational view of another tube drive assembly and purge gas control valve assembly located between successive cooling stages of the apparatus of FIG. 1.

Referring now to the drawings, and particularly to FIG. 1, there is schematically shown a metal tube induction annealing apparatus of the present invention, being generally designated by the numeral 10. The induction annealing apparatus 10 basically includes an induction heating enclosure 12, an induction heating system 14, a plurality of inert purge gas routing stages 16, a plurality of tube cooling stages 18, a plurality of tube drive assemblies 20, and a support frame 22 (as seen in FIG. 2). The induction heating system 14 is associated with the induction heating enclosure 12 for accomplishing annealing of a metal tube T as it is driven through the enclosure 12. The purge gas routing system 16 is associated with the tube cooling stages 18 and coupled to the induction heating enclosure 12 for bathing the tube T in inert purge gas during both annealing of the tube and subsequent progressive cooling thereof after annealing. The tube drive assemblies 20 are coupled with the induction heating enclosure 12 and gas routing and tube cooling stages 16, 18 and operable for continuously driving the tube T through the induction heating enclosure 12 and the purge gas routing and tube cooling stages 16, 18. The support frame 22 supports the induction heating enclosure 12, the induction heating system 14, the gas routing stages 16, the tube cooling stages 18, and the tube drive assemblies 20 in an arrangement which accomplishes effective and efficient annealing and cooling of metal tubes T, such as zirconium and zirconium alloy tubing used in the fabrication of nuclear fuel rods.

Referring to FIGS. 1 and 2, the induction heating enclosure 12 includes a protective housing 24, such as composed of plexiglass, an elongated glass tube 26 having a pair of opposite open ends 26A, 26B and a hollow interior defining an annealing chamber 28 for receiving the metal tube T for undergoing annealing and an inert purge gas for bathing the tube T during annealing, and means in the form of a pair of centering chuck assemblies 30 for supporting the glass tube 26 at its opposite ends within the housing 24 adjacent to the entrance and exit ends 24A, 24B thereof. Referring also to FIG. 10, the glass tube 26 has an inside diameter slightly greater than the outside diameter of the metal tube T for defining an annulus 32 between the interior surface of the glass tube 26 and exterior surface of the tube T for accommodating inert purge gas flow along the exterior of the tube T.

Referring to FIGS. 1 and 10, the induction heating system 14 includes an electrical induction unit 34 located at the exterior of the housing 24 and an electromagnetic coil 36 disposed in the interior of the housing 24 and encircling the glass tube 26 and electrically connected to the unit 34. Also, a sensor 38, such as a pyrometer capable of sensing infrared energy, is mounted to the housing 24 and connected to a feedback control 40 located at the exterior of the housing 24. The feedback control 40 connects the sensor 38 to the induction unit 34 for controlling the power output of the induction unit 34 and thereby maintaining a substantially constant temperature within the housing 24. The induction unit 34 is operable to energize the electromagnetic coil 36 to generate a magnetic field which penetrates unopposed through the glass tube 26 for producing induction heating and thereby annealing of the tube T as it passes through the annealing chamber 28. The tube 26 made of glass was selected, instead of some other material, since glass is capable of containing the inert gas while allowing for the electromagnetic flux to pass through and heat the tube T. Glass also allows for non-contact temperature measurement by the infrared pyrometer temperature sensor 38.

Referring to FIGS. 1 and 3-9, the pluralities of inert purge gas routing stages 16 and tube cooling stages 18 are disposed in end-to-end succession downstream of the induction heating enclosure 12 in flow communication with the annealing chamber 28. The gas routing stages 16 of the induction annealing apparatus 10 are constructed of hollow glass conduits 42 extending in opposite directions from, and connected by couplers 44, to drive housings 46. The glass conduits 42 of the gas routing stages 16 have control valves 48 and check valves 50 mounted strategically therealong, so as to cause the inert purge gas received through the control valves 48 to be directed upstream toward the drive housing 46 connected to the same conduit 42. In such manner, the flow of inert purge gas is directed in an upstream direction opposite to a downstream direction of movement of the metal tube T from the annealing chamber 28 and through the gas routing stages 16 and cooling stages 18. Inert purge gas counterflow accomplishes constant shielding or bathing of the outside and inside wall surfaces of the metal tube T during annealing and cooling of the tube T and facilitates removal of heat from the trailing end of the tube T by the gas flow through the interior thereof.

The tube cooling stages 18 of the induction annealing apparatus 10 are constructed of hollow tubular water jackets 56 supported by brackets 58 of the support frame 22 and, in turn, enclosing the routing conduits 42. The water jackets 56 extend in radially-spaced concentric relation with the gas routing conduits 42 so as to define an annulus therebetween for the flow of cooling water from inlet nipples 60 to discharge nipples 62 on the respective jackets 56.

Referring to FIGS. 1, 3 and 6-8, the tube drive assemblies 20 are provided upstream of the induction heating housing 12 and between the routing and cooling stages 16, 18. The drive assemblies 20 include sets of pinch rollers 64 disposed in the drive housings 46 and mounted by bearings 66 and driven by pulleys 68 connected to motors 70. The pinch rollers 64 engage and drive the metal tube T so as to produce movement of the tube T in the desired direction through the glass tube 26 defining the annealing chamber 28 and the glass conduits 42 of the tube routing stages 16. Purging valves 72, 74 are coupled to the drive housings 46 for respectively introducing and evacuating gas therefrom.

A key design feature of the induction annealing apparatus 10 is keeping the inside diameter of the glass tube 26 as small as possible to force inert purge gas flow through the metal tube T. The small diameter annealing chamber defined by the glass tube 26 does not permit pockets of atmosphere to develop. Such pockets of atmosphere (containing oxygen and nitrogen) if allowed to form would create residue problems on the exterior and interior wall surface of the metal tube T. Another key design feature is the direction the inert purge gas is made to flow through the routing stages 16. The location of the inert gas inlets and the direction of gas flow are significant factors affecting the acceptable quality of the annealed metal tube T. Tests have found that only when the gas is introduced downstream of the annealing chamber 28 and directed back in the opposite direction from that of the metal tube travel do the exterior and interior wall surfaces of the metal tube T achieve acceptable quality. In addition to the shielding benefits, this location and direction in which the inert gas is introduced aids in the heat dissipation process.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A metal tube induction annealing apparatus, comprising:

(a) an induction heating enclosure including an elongated glass tube having a pair of opposite open ends and a hollow interior and means for supporting said glass tube, said glass tube defining an annealing chamber for receiving a hollow metal tube for undergoing annealing and an inert purge gas for bathing the metal tube during annealing, said glass tube having an inside diameter slightly greater than the outside diameter of the metal tube for defining an annulus therebetween for accommodating inert purge gas flow along an exterior surface of the metal tube;

(b) an induction heating system including an electromagnetic coil encircling said glass tube of said enclosure and means connected to said coil and being operable to energize said coil to generate a magnetic field through said glass tube for producing induction heating and annealing of the metal tube as it passes through said annealing chamber;

(c) means disposed downstream of said induction heating enclosure in flow communication with said glass tube thereof for receiving an inert purge gas and directing flow thereof in an upstream direction opposite to a downstream direction of movement of the metal tube through said glass tube and said annealing chamber defined by said glass tube for accomplishing constant bathing of exterior and interior surfaces of the metal tube and removal of heat by the inert gas flow through the hollow metal tube and from a trailing end thereof; and (d) means for engaging and driving the metal tube to produce movement of the metal tube through said glass tube and said annealing chamber.

2. The apparatus as recited in claim 1, wherein said receiving and directing means includes a plurality of gas routing stages disposed end-to-end downstream of said induction heating enclosure.

3. The apparatus as recited in claim 2, wherein said receiving and directing means also includes a plurality of cooling stages disposed downstream of said induction heating enclosure and surrounding said respective inert gas routing stages.

4. The apparatus as recited in claim 3, wherein said inert gas routing stages include a plurality of glass conduits having control valves and check valves and gas inlet and outlet nozzles mounted therealong so as to cause the inert purge gas received through said inlet nozzle to be directed toward said outlet nozzle of the same conduit such that the inert purge gas is directed in an upstream direction opposite to a downstream direction of movement of the metal tube from said annealing chamber and through said gas routing stages so as to accomplish constant bathing of the outside and inside wall surfaces of the metal tube during annealing and cooling of the metal tube and facilitate removal of heat from the trailing end of the metal tube by the gas flow through the interior thereof.

5. The apparatus as recited in claim 4, wherein said cooling stages include a plurality of hollow water jackets enclosing the routing conduits and having inlet and discharge nipples at opposite ends, said water jackets extend in radially-spaced concentric relation with said gas routing conduits so as to define an annulus therebetween for the flow of cooling water from inlet nipples to discharge nipples on said respective jackets.

6. The apparatus as recited in claim 1, wherein said induction heating enclosure also includes a protective housing and means in the form of a pair of centering chuck assemblies for supporting said glass tube at its opposite ends within said housing adjacent to the entrance and exit ends thereof.

7. The apparatus as recited in claim 6, wherein said induction heating system also includes an electrical induction unit located at the exterior of said housing and an electromagnetic coil disposed in the interior of the housing and encircling the glass tube and electrically connected to said unit, said induction unit being operable to energize said coil to generate a magnetic field which penetrates unopposed through said glass tube for producing induction heating and thereby annealing of the metal tube as it passes through said annealing chamber.

8. The apparatus as recited in claim 7, wherein said induction heating system also includes a sensor mounted to said housing and connected to a feedback control and located at the exterior of said housing, said feedback control connects the sensor to the induction unit for controlling the power output of the induction unit and thereby maintaining a substantially constant temperature within said housing.

9. The apparatus as recited in claim 1, wherein said engaging and driving means are drive assemblies provided upstream of the induction heating housing and between the routing and cooling stages.

10. The apparatus as recited in claim 9, wherein said drive assemblies include sets of pinch rollers and means for driving said pinch rollers for engaging and driving the metal tube so as to engage and drive the metal tube and produce movement thereof in the desired direction through said glass tube defining said annealing chamber.

* * * * *